(12) United States Patent
Sano et al.

(10) Patent No.: US 10,852,767 B2
(45) Date of Patent: Dec. 1, 2020

(54) HANDWRITING SUPPORT DEVICE

(71) Applicant: FUJIFILM CORPORATION, Tokyo (JP)

(72) Inventors: Takahiro Sano, Kanagawa (JP); Masayuki Naya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/788,249

(22) Filed: Feb. 11, 2020

(65) Prior Publication Data

US 2020/0183453 A1 Jun. 11, 2020

Related U.S. Application Data

(63) Continuation of application No. PCT/JP2018/030564, filed on Aug. 17, 2018.

(30) Foreign Application Priority Data

Sep. 27, 2017 (JP) ................. 2017-187091

(51) Int. Cl.
*G09B 11/00* (2006.01)
*G06F 1/16* (2006.01)
(Continued)

(52) U.S. Cl.
CPC ............ *G06F 1/1632* (2013.01); *G02B 5/08* (2013.01); *G06F 3/03545* (2013.01); *G06F 3/0416* (2013.01)

(58) Field of Classification Search
CPC .................................................. G09B 11/00
(Continued)

(56) References Cited

U.S. PATENT DOCUMENTS 1,111,608 A * 9/1914 O'Brien ............... G09B 11/06
434/88
1,420,491 A * 6/1922 Morse ..................... B43L 13/18
359/635
(Continued)

FOREIGN PATENT DOCUMENTS

JP 2004-109540 A 4/2004
JP 2008-027223 A 2/2008
(Continued)

OTHER PUBLICATIONS

International Search Report issued in International Application No. PCT/JP2018/030564 dated Nov. 6, 2018.
(Continued)

*Primary Examiner* — Kurt Fernstrom
(74) *Attorney, Agent, or Firm* — Solaris Intellectual Property Group, PLLC

(57) ABSTRACT

A handwriting support device includes a half mirror; an image display surface; a writing surface, a virtual image of an image displayed on the image display surface being projected on the writing surface. In a case where a real object is inserted onto the writing surface, the image display control unit causes a non-display processed image to be displayed on the image display surface, the non-display processed image being obtained by at least a partial region, of a region of the first image corresponding to a vertically projected region of the real object on the writing surface, being subjected to non-display processing. In the handwriting support device, an image, which is a virtual image of the non-display processed image in which at least a part of an inside of the vertically projected region of the real object is non-displayed, is projected onto the writing surface.

13 Claims, 10 Drawing Sheets

(51) Int. Cl.
*G02B 5/08* (2006.01)
*G06F 3/0354* (2013.01)
*G06F 3/041* (2006.01)

(58) Field of Classification Search
USPC .......... 434/81, 85, 88, 89, 92, 162–165, 303
See application file for complete search history.

(56) References Cited

U.S. PATENT DOCUMENTS

| | | | | | |
|---|---|---|---|---|---|
| 1,518,680 | A * | 12/1924 | Arnot | .................... | B43L 13/18 359/872 |
| 2,387,021 | A * | 10/1945 | Hendershot | ............ | B43L 13/18 359/635 |
| 4,464,118 | A * | 8/1984 | Scott | ...................... | G09B 11/00 434/159 |
| 5,671,091 | A * | 9/1997 | Monroe | ............... | G02B 27/022 108/10 |
| 5,751,477 | A * | 5/1998 | Tomita | ................... | B43L 13/18 359/447 |
| 6,579,099 | B1 * | 6/2003 | Pipes, Jr. | .............. | G09B 11/04 33/1 K |
| 6,810,591 | B2 * | 11/2004 | D'Estais | ................ | B43L 13/18 33/1 K |
| 7,775,799 | B2 * | 8/2010 | Reiber | ................... | G09B 25/08 434/303 |
| 9,521,276 | B2 * | 12/2016 | Short | ..................... | G03B 17/54 |
| 10,562,337 | B2 * | 2/2020 | Naya | ......................... | B43L 5/00 |
| 2004/0244570 | A1 | 12/2004 | Ando | | |
| 2012/0062594 | A1 | 3/2012 | Campbell | | |
| 2017/0320353 | A1 | 11/2017 | Naya | | |
| 2018/0101223 | A1 | 4/2018 | Ishihara et al. | | |

FOREIGN PATENT DOCUMENTS

| | | | |
|---|---|---|---|
| JP | 2012-064214 A | 3/2012 | |
| JP | 2016-194744 A | 11/2016 | |
| WO | 2014/188367 A1 | 11/2014 | |
| WO | 2016/121362 A1 | 8/2016 | |

OTHER PUBLICATIONS

Written Opinion of the ISA issued in International Application No. PCT/JP2018/030564 dated Nov. 6, 2018.
Muranaka, Noriaki et al., "A Calligraphy Mastering Support System Using Virtual Reality Technology and its Learning Effects," IEEJ Transactions on Fundamentals and Materials, vol. 123, No. 12, Mar. 1, 2004 [retrieved on Oct. 23, 2018] Internet : <URL :https:// www. jstage. jst. go. jp/article /ieejfms /123/ 12/123_12_1206/_pdf /-char/ ja> <DOI: I0.1541/ieejfms.123.1206>, p. 1207.

* cited by examiner

HANDWRITING SUPPORT DEVICE

CROSS-REFERENCE TO RELATED APPLICATIONS

This application is a continuation application of International Application No. PCT/JP2018/030564, filed Aug. 17, 2018, the disclosure of which is incorporated herein by reference in its entirety. Further, this application claims priority from Japanese Patent Application No. 2017-187091, filed Sep. 27, 2017, the disclosure of which is incorporated herein by reference in its entirety.

BACKGROUND OF THE INVENTION

1. Field of the Invention

The present disclosure relates to a handwriting support device that performs guide for preventing the collapse of lines or balance when characters are written by hand.

2. Description of the Related Art

Currently, an augmented reality (AR) technique is known that adds visual information, such as virtual objects, to real space to augment the real world observed by a person. JP2016-194744A (hereinafter referred to as Patent Document 1) discloses a method of controlling drawing of a virtual object (hereinafter referred to as an "AR object") from a positional relationship of a real object in a depth direction with respect to the AR object. In a case where the ratio of a distance from a visual point of an observer to the surface of the AR object to a distance from the visual point to the real object is R, this method is a method of multiplying the size of the real object seen by the observer by R and drawing the real object on the surface of the AR object.

Additionally, JP2008-027223A (hereinafter referred to as Patent Document 2) proposes a technique of making the presence of an AR object close to reality by causing a tactile sense corresponding to a video to be perceived by tracing an object positioned in a video space. Patent Document 2 includes a see-through type head-mounted display, a see-through type display consisting of a display and a half mirror, a projector for projecting a video from the display, and the like, as video presentation means. In a case where the video presentation means is in a positional relationship in which the video presentation means is closer to the eyes than user's fingers touching the object, there is a problem that the video is placed on the fingers and the AR object is perceived in front of the fingers. However, it is disclosed that the problem that the video is displayed on the fingers can be solved by bringing a positional relationship in which the presentation means is farther from the eyes than the fingers.

Meanwhile, WO2016/121362A (hereinafter referred to as Patent Document 3) proposes a handwriting support system for preventing the collapse of lines or balance in a case where characters are written in a document that needs to be handwritten. The device of Patent Document 3 uses an AR technique and is configured to reflect a mirror image of a model image displayed on an image display surface with a half mirror and cause a user to visually recognize a reflected image (virtual image) so as to coincide with a writing surface.

SUMMARY OF THE INVENTION

However, in the handwriting support device of Patent Document 3, the virtual image that should be under the user's hand at the time of writing is displayed to be superimposed on the hand. Therefore, there is a case where a problem occurs in depth perception and the user feels strong discomfort at the time of writing. Human depth perception is obtained on the basis of two types of visual information: binocular and monocular. In the configuration in which the virtual image (AR object) using the half mirror is projected on the writing surface, it is determined from the "binocular parallax" that the AR object is present behind the hand. On the other hand, in reality, since the AR object overlaps the hand that is the real object and is visually recognized through the hand, it is determined that the AR object is present in front of the hand by the "monocular shielding effect". Since the user simultaneously acquires visual information from the binocular and monocular, the user feels a strong discomfort due to a shift in information.

The invention has been made in view of the above circumstances, and an object of the present invention is to provide a handwriting support device that can reduce discomfort felt by a user during use and improve a handwriting support function.

A handwriting support device according to the present disclosure comprises a half mirror; an image display surface positioned to face at a side of a mirror surface of the half mirror; a writing surface positioned to face the image display surface with the mirror surface of the half mirror interposed therebetween. A virtual image of an image displayed on the image display surface is projected on the writing surface. The handwriting support device comprises an image display control unit that causes a first image to be displayed on the image display surface. In a case where a real object is inserted onto the writing surface, the image display control unit causes a non-display processed image to be displayed on the image display surface, the non-display processed image being obtained by at least a partial region, of a region of the first image corresponding to a vertically projected region of the real object on the writing surface, being subjected to non-display processing, whereby an image, which is a virtual image of the non-display processed image in which at least a part of an inside of the vertically projected region of the real object is non-displayed, is projected onto the writing surface.

In the handwriting support device according to the present disclosure, the image display control unit may include an object position sensor that detects the real object on the writing surface, and may create the non-display processed image from image data of the real object acquired by the object position sensor and displays non-display processed image on the image display surface.

In the handwriting support device according to the present disclosure, the image display control unit may cause an image to be displayed on the image display surface as the non-display processed image, the image being obtained by only a region, which is inside a position of a predetermined length from the region of the first image corresponding to the vertically projected region of the real object on the writing surface, being subjected to non-display processing. In this case, as the virtual image of the non-display processed image, the image obtained by only the region inside the position of the predetermined length from the contour of the vertically projected region being non-displayed is projected on the writing surface.

Here, the predetermined length is greater than 0 mm from the contour, and can be any length within a range where the effects of the invention are exhibited, but is preferably within 10 mm from the contour.

In the handwriting support device according to the present disclosure, the image display control unit may overlay a second image, having a smaller display area than the first image, on the non-display processed image to display the second image on the image display surface.

In the handwriting support device according to the present disclosure, the image display control unit preferably causes the second image to be displayed on the display surface such that at least partially part of the second image overlaps with the partial region subjected to the non-display processing of the non-display processed image.

In the handwriting support device according to the present disclosure, it is more preferable that the image display control unit causes the entire second image to be overlaid and displayed on the partial region.

According to the handwriting support device according to the present disclosure, it is possible to suppress that the virtual image is overlaid and displayed on a user's hand holding a writing instrument. Therefore, the discomfort felt by the user regarding positional information between the virtual image and the position of the hand can be reduced. Therefore, a handwriting support function can be improved.

DESCRIPTION OF THE PREFERRED EMBODIMENTS

Hereinafter, embodiments of the invention will be described with reference to the drawings.

Figure 1:
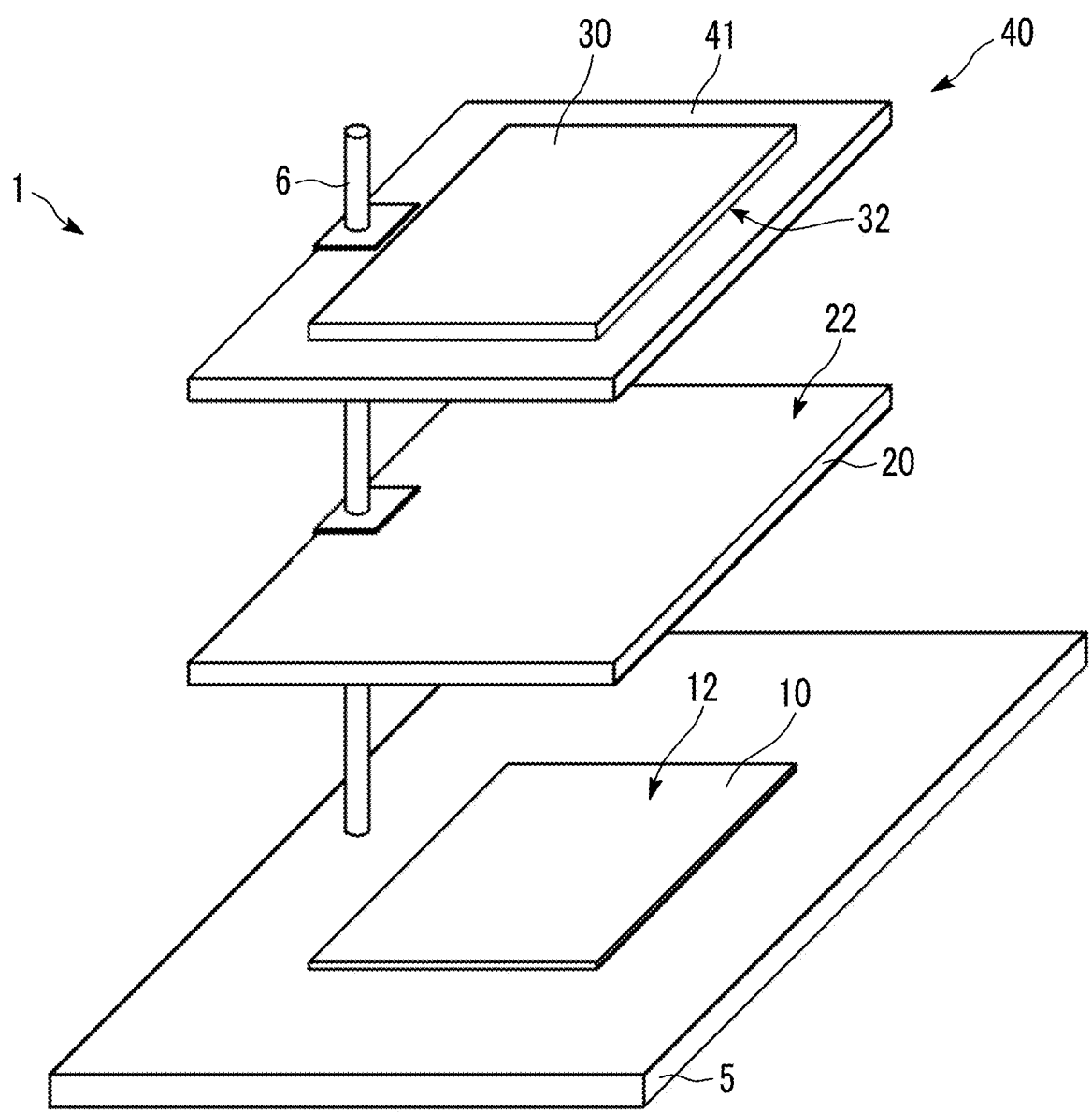
FIG. 1 is a perspective view illustrating a schematic configuration of a handwriting support device according to a first embodiment of the invention.
Figure 2:
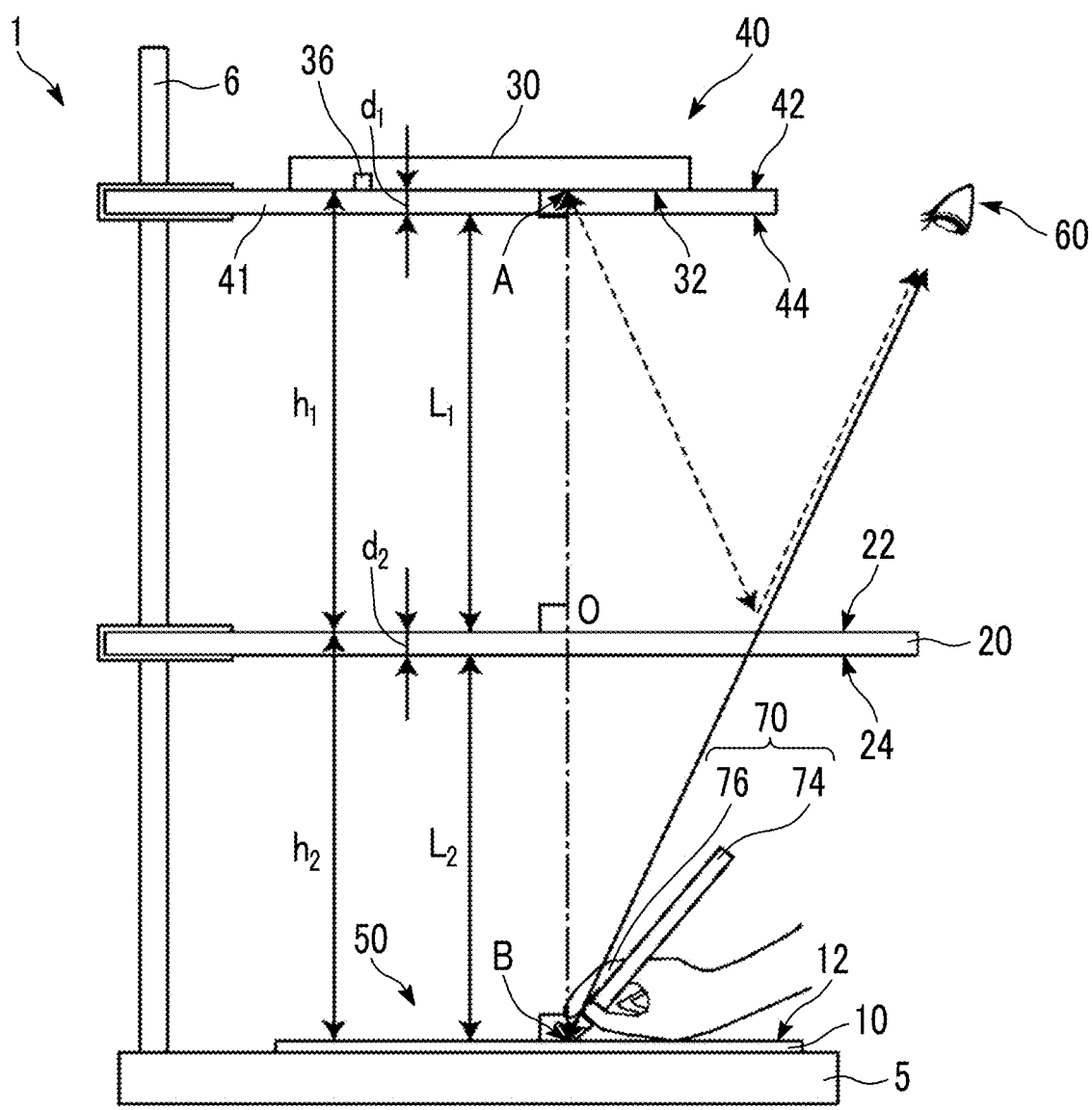
FIG. 2 is a side view illustrating the schematic configuration of the handwriting support device illustrated in FIG. 1.

FIG. 1 is a perspective view of a schematic configuration of a handwriting support device according to an embodiment of the invention, and FIG. 2 is a side view illustrating a positional relationship among a writing surface, a mirror surface, and an image display surface in the handwriting support device 1 of the present embodiment.

As illustrated in FIGS. 1 and 2, the handwriting support device 1 of the present embodiment comprises a half mirror 20, an image display surface 32 positioned to face the mirror surface 22 of the half mirror 20, and a writing surface 12 positioned to face the image display surface 32 with the mirror surface 22 of the half mirror 20 interposed therebetween. By virtue of the present configuration, in the handwriting support device 1, a virtual image of an image displayed on the image display surface 32 is projected onto the writing surface 12. In the present embodiment, the positions of the half mirror 20, the image display surface 32, and the writing surface 12 are adjusted such that an optical distance between the writing surface 12 and the mirror surface 22 is equal to an optical distance between the mirror surface 22 and the image display surface 32. However, the invention is not limited to the present configuration as long as the virtual image reflected in the half mirror 20 is projected onto the writing surface 12 with a desired size. In addition, the writing surface 12 is a surface on which a writing medium 10, such as a sheet, on which a user writes characters, pictures, or the like is disposed in a case where the handwriting support device 1 is used. However, in the following, the writing surface 12 will be described as being regarded as the surface of the writing medium 10. The image display surface 32 is constituted of, for example, a panel surface of image presentation body 30, such as a display or a tablet computer and a smart phone provided with the display.

Figure 3:
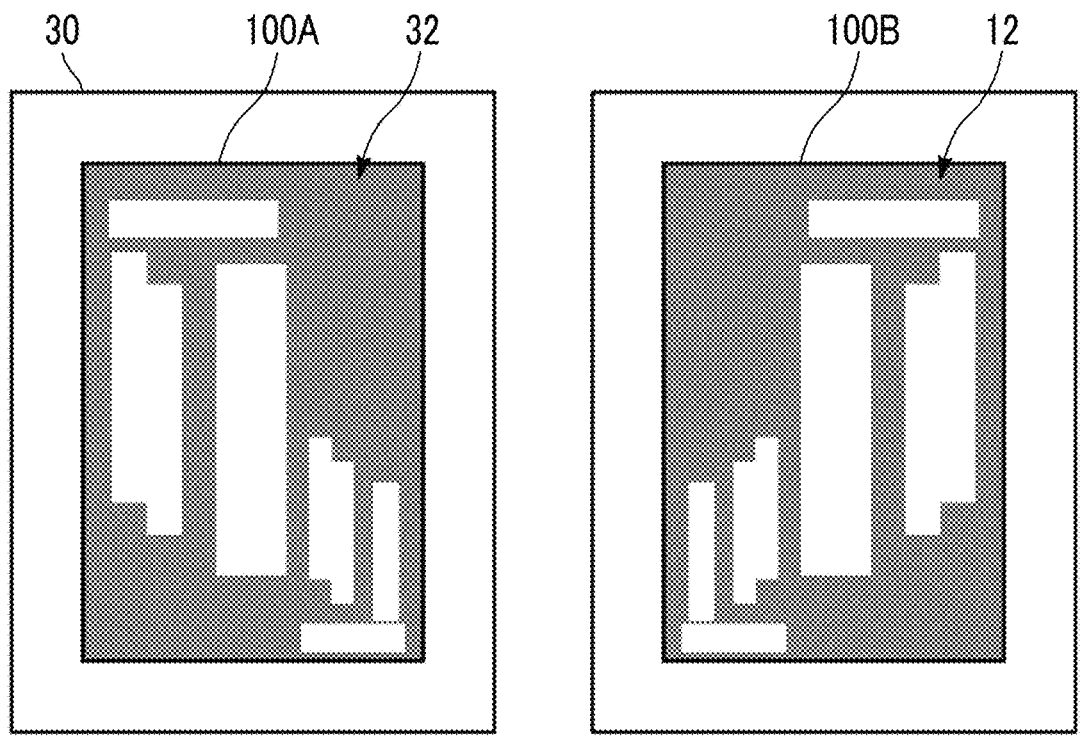
FIG. 3 is a schematic view illustrating images displayed on an image display surface and a writing surface.

A left figure of FIG. 3 is an image 100A displayed on the image display surface 32 of the image presentation body 30, and a right figure is a reflected image (virtual image) 100B of the image 100A projected onto the writing surface 12. As illustrated in FIG. 3, the image 100A, which is a mirror image of the image 100B to be displayed on the writing surface 12, is displayed on the image display surface 32. The image 100B illustrated herein is a layout image of a region where the address, destination, and the like of a cover of a postcard should be written.

As illustrated in FIG. 2, in a case where the user views the writing surface 12 from the observation unit 60 on the mirror surface 22 side of the half mirror 20, a reflected image (virtual image) 100B obtained by the mirror image 100A displayed on the image display surface 32 being reflected by the mirror surface 22 and being visually recognized appears to coincide with the writing surface 12. That is, in the present specification, "a virtual image is projected onto the writing surface" means a state where the image is seen to the user as if the image is directly projected onto the writing surface 12. However, actually, the user sees the virtual image of the mirror image reflected by the mirror surface 22, and the image is not directly projected unlike the display of an image by a projector.

The half mirror 20 comprises the mirror surface 22. The half mirror 20 may be a half mirror that reflects a part of the light incident onto the mirror surface 22 and transmits a part of the light, and as illustrated in FIG. 2, may be a half mirror that allows the writing surface 12 to be visually recognized from the observation unit 60 and that has the reflectivity and the transmittance such that the mirror image (the image to be displayed originally) of the mirror image that is reflected by the half mirror 20 and displayed on the image display surface 32 can be overlappingly and visually recognized on the writing surface 12.

In the handwriting support device 1 of the present embodiment, the image presentation body 30 having the image display surface 32 is supported by a support member 40 such that the image display surface 32 faces the mirror surface 22 of the half mirror 20. The support member 40 comprises a supporting plate 41 on which the image presentation body 30 is placed. The supporting plate 41 has transparency that allows an image displayed on the image display surface 32 of the image presentation body 30 to be copied to the mirror surface 22.

The handwriting support device 1 comprises a support base 5 on which the writing medium 10 is placed, and a support shaft 6 for positioning the half mirror 20 and the support member 40 of the image presentation body 30 on the support base 5. It is preferable that the half mirror 20 and the support member 40 are configured so as to be movable upward and downward along the support shaft 6.

In the present embodiment, the mirror surface 22 of the half mirror 20 is a surface on the image presentation body 30 side and is positioned such that the writing surface 12, the mirror surface 22, and the image display surface 32 are parallel to each other and an optical distance $h_1$ between the image display surface 32 and the mirror surface 22 and an optical distance $h_2$ between the mirror surface 22 and the writing surface 12 are equal to each other. That is, the optical distance $h_1$ from an optional point O of the mirror surface 22 to an intersection point A between a perpendicular line intersecting the mirror surface 22 at right angles through this arbitrary point O and the image display surface 32, and the optical distance $h_2$ from the arbitrary point O to an intersection point B between the same perpendicular line and the writing surface 12 are equal to each other.

In the present configuration, the optical distance h1 between the image display surface 32 and the mirror surface 22 is expressed by a sum of a product $n_1 \cdot d_1$ of a thickness $d_1$ and a refractive index $n_1$ of the supporting plate 41, and a distance $L_1$ between a lower surface 44 of the supporting plate 41 and the mirror surface 22, that is, $h_1 = n_1 \cdot d_1 + L_1$. Additionally, the optical distance $h_2$ between the mirror surface 22 and the writing surface 12 is expressed by a sum of a product $n_2 \times d_2$ of a thickness $d_2$ of the half mirror 20, and a refractive index $n_2$, and a distance $L_2$ between the lower surface 24 of the half mirror 20 and the writing surface 12, that is, $h_2 = n_2 \cdot d_2 + L_2$.

In this way, in the handwriting support device 1 of the present embodiment, the virtual image of the image displayed on the image display surface 32 can be projected onto the writing surface 12 by the position of the half mirror 20 and the position of the image presentation body 30 being adjusted such that the optical distances $h_1$ and $h_2$ are equal to each other.

The present handwriting support device 1 comprises an image display control unit 35 that causes an image to be displayed on the image display surface 32. In a case where a real object 70 is inserted on the writing surface 12, the image display control unit 35 causes a non-display processed image, in which at least a part of a region corresponding to a vertically projected region of the real object 70 onto the writing surface 12 is subjected to non-display processing, to be displayed on the image display surface 32. As a result, in the handwriting support device 1, a virtual image of the non-display processed image displayed on the image display surface 32 and an image in which only at least a part inside the vertically projected region of the real object is non-displayed are projected onto the writing surface.

Here, the writing surface 12 is a space between the writing surface 12 and the half mirror 20. As the real object 70 inserted onto the writing surface 12, user's fingers 76 and a writing instrument 74 are mainly assumed.

Figure 4:
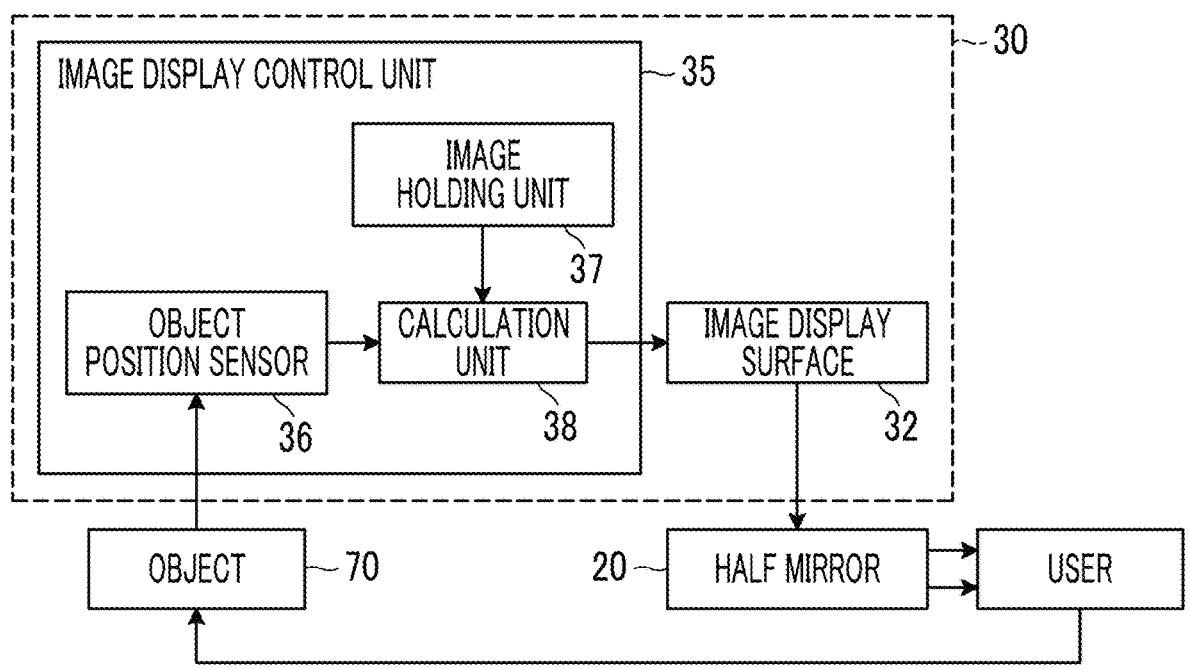
FIG. 4 is a block diagram illustrating a calculation block diagram in the handwriting support device.

In the present embodiment, an image display control unit 35 is provided inside the image presentation body 30. In this case, a calculation block diagram of the image display control unit 35 is illustrated in FIG. 4. The image display control unit 35 comprises an object position sensor 36 that detects the real object 70 inserted on the writing surface 12, an image holding unit 37 that holds image data of a mirror image of an image to be displayed on the writing surface 12, and a calculation unit 38. The object position sensor 36 is, for example, a camera or an infrared sensor.

A first display method by the image display control unit 35 will be described with reference to FIGS. 5 and 6. In the following description, a case will be described in which the writing surface 12 is the surface of a postcard, and an image to be displayed on the writing surface 12 is a postcard layout image 100 that is displayed as a first image and that includes a region where an address, recipient name, and the like are to be written. The image holding unit 37 is a storage unit that stores image data of the layout image 100. The image holding unit 37 stores not only the postcard layout image but also image data of various layout images, and the calculation unit 38 can read out appropriate image data depending on writing surfaces.

As already described, the mirror image of the image projected onto the writing surface 12 is displayed on the image display surface 32. However, in order to facilitate visual understanding, in the drawings after FIG. 5, projected virtual images of images displayed on the image display surface will be illustrated and described.

The calculation unit 38 calculates the contour information of the vertically projected region of the real object 70 on the writing surface 12 from the image data of the real object acquired by the object position sensor 36. The contour information is, for example, shape data of the vertically projected region and coordinate data on the writing surface.

Figure 5:
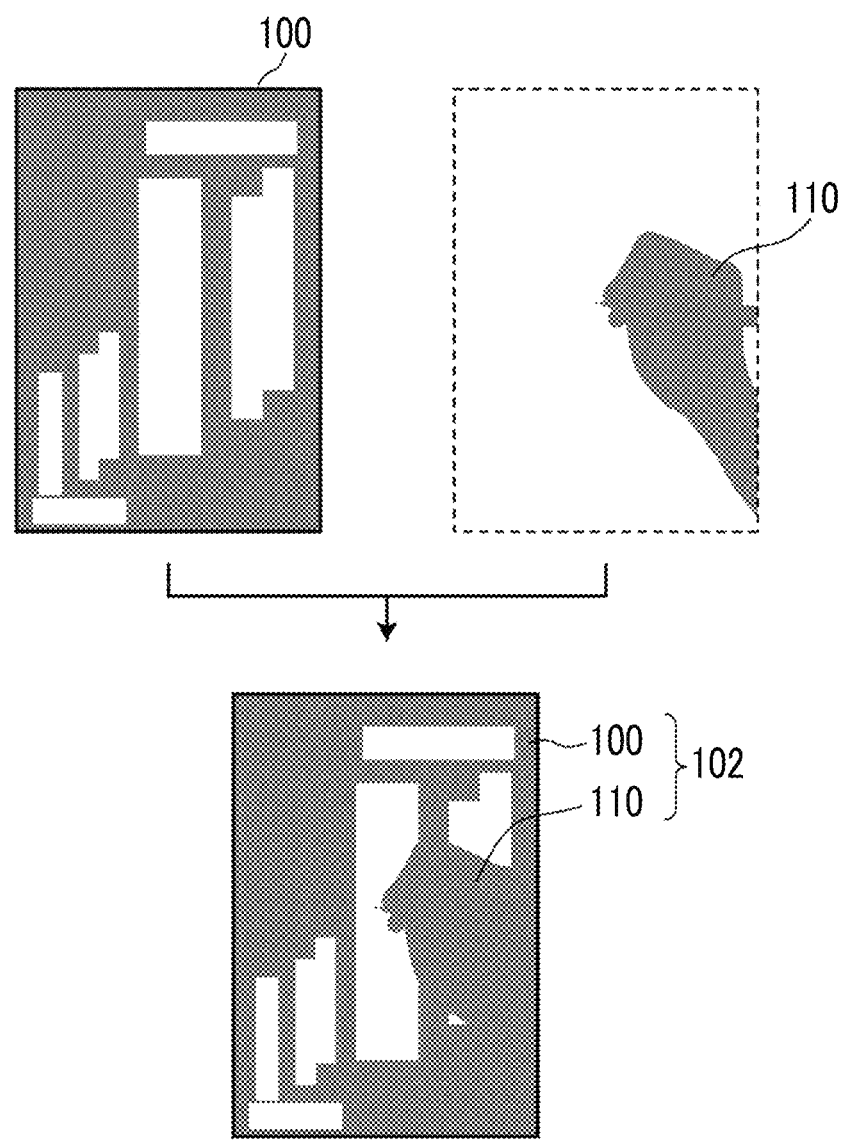
FIG. 5 is a view for illustrating a first display method.

On the basis of the above-described contour information, the calculation unit 38 creates a processing target region image 110 in which the region on the image display surface corresponding to the vertically projected region on the writing surface is non-displayed (refer to FIG. 5). In FIG. 5, a broken line surrounding the processing target region image 110 coincides with an outer periphery of the layout image 100. The processing target region image 110 coincides with a region corresponding to the vertically projected region on the writing surface of the real object 70 in the coordinates on the layout image 100. The processing target region image 110 is superimposed on the layout image 100 to create the non-display processed image 102 in which the region corresponding to the vertically projected region of the layout image 100 onto the writing surface of the real object is subjected to the non-display processing. Then, the non-display processed image 102 is displayed on the image display surface 32. In the following description, the region subjected to the non-display processing in the layout image 100 is referred to as a non-display region.

Figure 6:
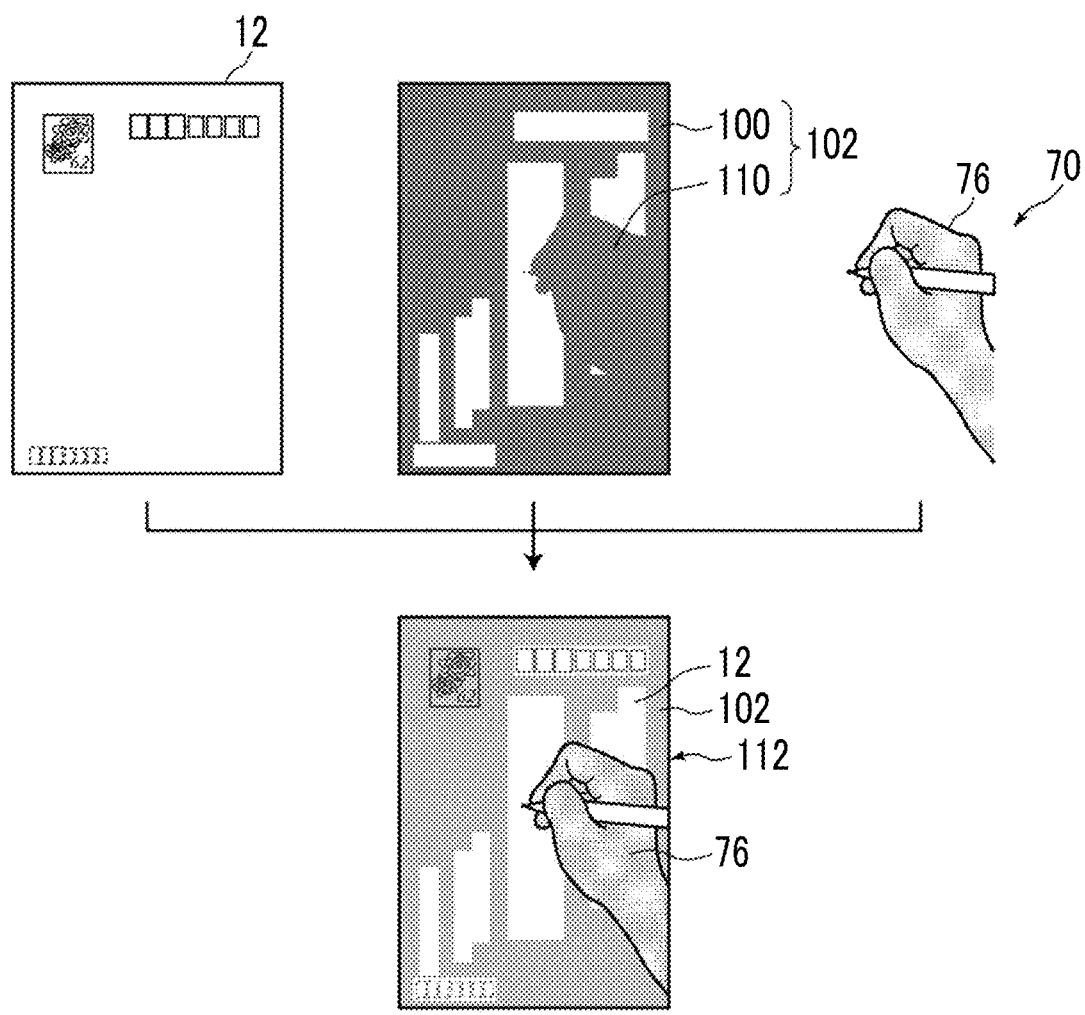
FIG. 6 is a view illustrating a state of the writing surface viewed from a user in the case of the first display method.

By virtue of the above operation, as illustrated in a lower figure of FIG. 6, the user recognizes a visual field image 112 in which the writing surface 12, the non-display processed image 102, and his/her own fingers 76 are stacked. Since the user recognizes that his/her own fingers 76 are positioned on the writing surface 12 and the non-display processed image 102, the user can perform a writing work without discomfort in depth feeling.

In addition, the movement of the real object 70 on the writing surface 12 detected by the object position sensor 36 is always sent to the calculation unit 38, and the non-display processed image in which the non-display region changes depending on the movement of the real object 70 is displayed.

In the above first display method, the image display control unit 35 creates the non-display processed image 102 in which a region coinciding with the vertically projected region of the real object 70 is non-displayed, and causes the image to be displayed on the image display surface. However, the display method is not limited to the display method in which the entire vertically projected region of the real object 70 is non-displayed, and as long as at least a part of the vertically projected region is non-displayed, the discomfort can be reduced compared to a case where the layout image is projected over the entire finger region.

Figure 7:
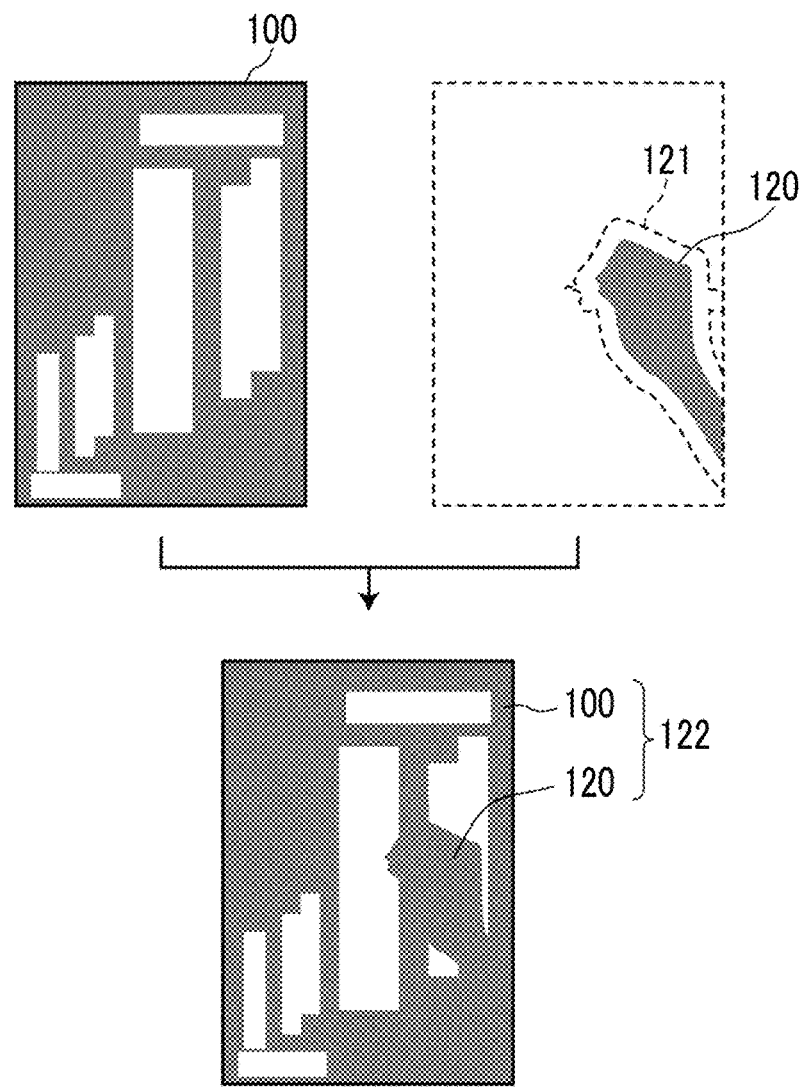
FIG. 7 is a view for illustrating a second display method.

As the second display method, as illustrated in FIG. 7, a processing target region image 120 may be created in which only a region present inside by a predetermined length from a contour 121 of the vertically projected region of the real object 70 is non-displayed and may be superimposed on the layout image 100 to obtain a non-display processed image 122. The predetermined length is preferably inside the contour 121 and within 10 mm from the contour 121. In this case, as illustrated in a visual field image 124 illustrated in FIG. 8, the user visually recognizes a part of the first image at an edge along the contour of his/her own fingers that are the real object 70 as the part of the first image is transmitted. However, since the first image does not overlap the centers of the fingers, the writing work can be performed without discomfort compared to a case where the first image is visually recognized to overlap the entire finger region. Additionally, in a case where the image processing does not sufficiently follow the movement of the hand or in a case where the viewing position is shifted, even in a case where the non-display region and the vertically projected region of the hand are partially shifted from each other, information on the layout image can be prevented from missing.

In the invention, in the image display control unit 35, the region subjected to the non-display processing is only the contour of the vertically projected region of the real object 70 onto the writing surface and the inside thereof, and the non-display processing is not performed on a range beyond the contour of the vertically projected region. However, there is a case where the non-display processing region is displayed to be shifted from the vertically projected region of the real object due to a shift in the image display processing or a shift in the viewing direction. Although it is allowed that the non-display region is visually recognized in a part of the projected image due to a shift that does not affect the efficiency of the writing work, shading processing for forming the shadow of the real object 70, such as fingers, is not included in the range of the non-display processing in the invention. In a case where the non-display processing is performed over a wide range beyond the contour of the vertically projected region of the real object, information on the layout image to be displayed is lost. As in the present disclosure, as long as the non-display processing is performed only inside the vertically projected region, missing of information other than a region overlapping a real object in the layout image does not occur, which is preferable.

The image display control unit 35 may further be configured to overlay a second image on the non-display processed image 122 to display the second image on the image display surface 32. The second image is an image having a display area smaller than that of the layout image 100, and is, for example, a guide image illustrating contents to be written in an entry region.

Figure 9:
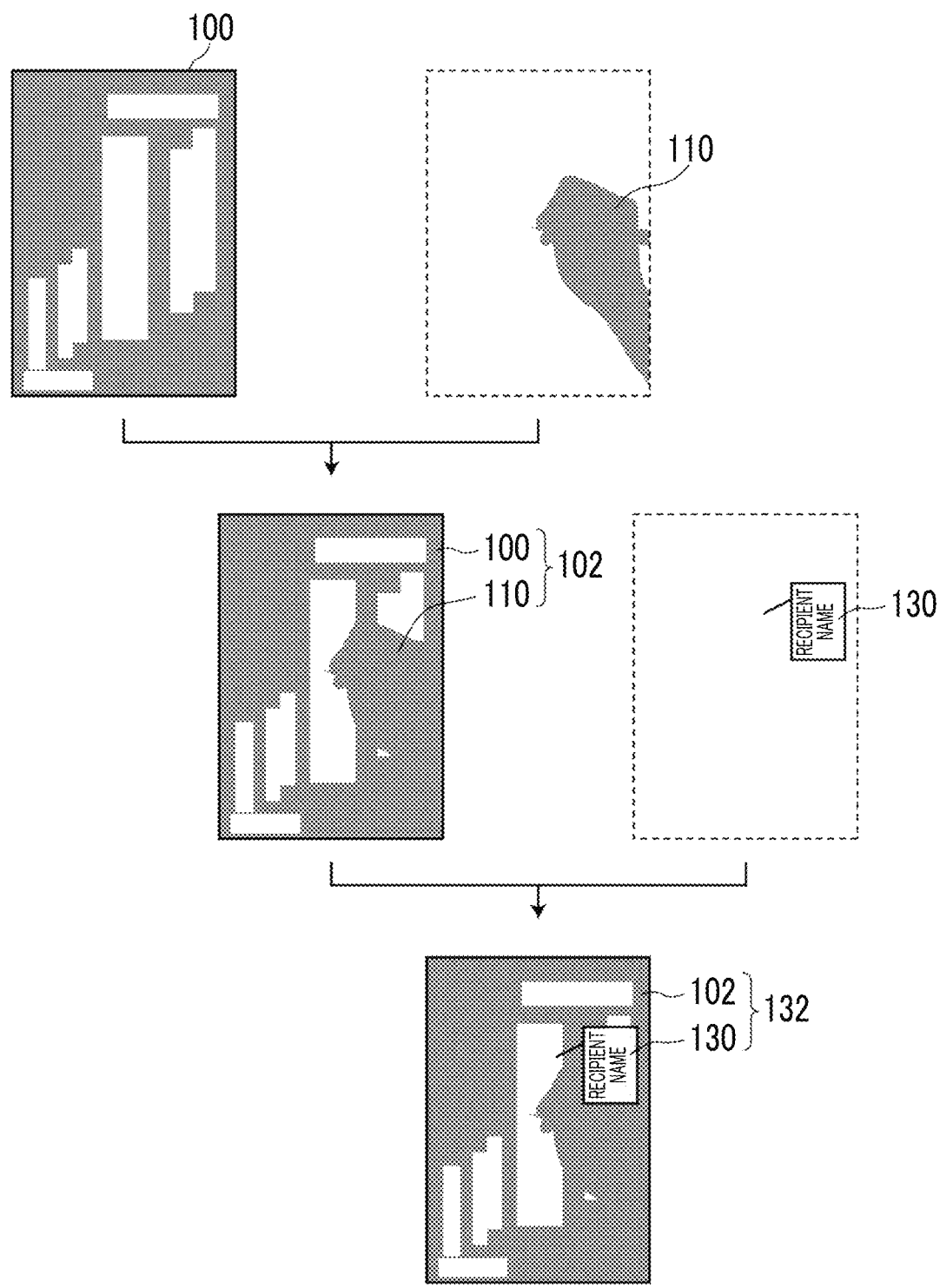
FIG. 9 is a view for illustrating a third display method.

A third display method for overlay-displaying a guide image 130 illustrating "recipient name" as the second image will be described with reference to FIG. 9.

The non-display processed image 102 in which the region coinciding with the vertically projected region of the real object 70 is non-displayed by superimposing the processing target region image 120 on the layout image 100 is created similarly to the case of the first display method. The overlay image 132 obtained by overlaying the guide image 130 on an upper layer of the non-display processed image 102 is displayed on the image display surface 32.

Figure 10:
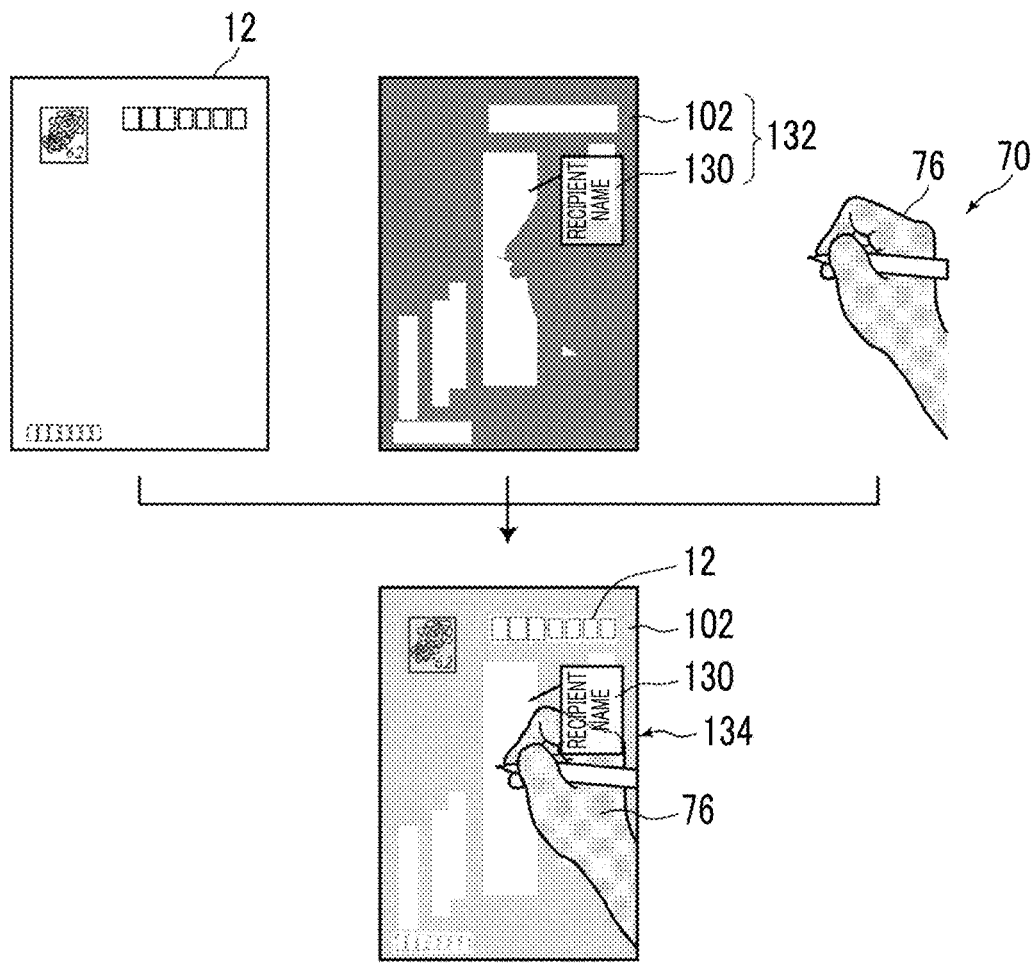
FIG. 10 is a view illustrating a state of a writing surface viewed from the user in the case of the third display method.

By virtue of the above operation, as in a visual field image 134 illustrated in the lower figure of FIG. 10, the user visually recognizes the guide image 130 in the overlay image 132 such that the guide image partially overlaps his/her own fingers 76, and can visually recognize the layout image only on the writing surface 12 behind the fingers 76 without visually recognizing the virtual image of the layout image through your fingers 76. Even in this case, the user can visually recognize that the fingers 76 is positioned on the non-display processed image 102 displayed to coincide with the writing surface 12. Moreover, since the contents to be entered can be immediately understood from the guide image 130, the work can be efficiently performed. In addition, the guide image 130 may be displayed in a region that does not overlap the non-display region. However, as the guide image 130 overlaps the hand and is recognized to be present in front of the hand, the user can be caused to feel that the non-display processed image 102 including the layout image is present behind the hand, and this is preferable because the effect of reducing the discomfort is further enhanced.

Figure 11:
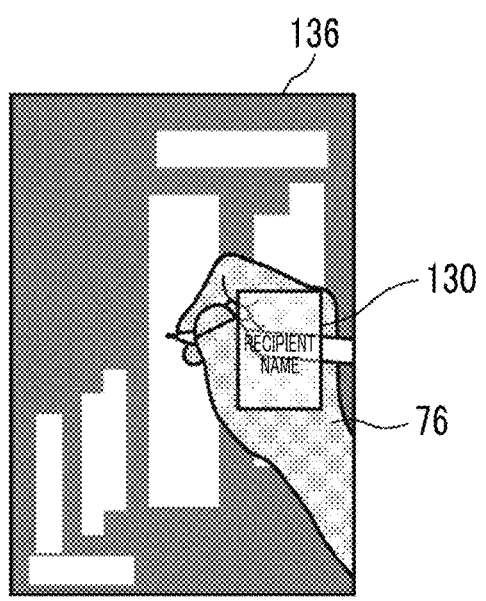
FIG. 11 is a view illustrating a state of the writing surface viewed from the user in the case of a fourth display method.

Moreover, as illustrated in FIG. 11, the entire guide image 130 may be displayed to overlap the non-display region. Since the guide image 130 is not overlaid on the layout image, it is easier to perceive that the layout image is positioned behind the real object 70, and the guide image 130 is positioned in front of the real object 70, thereby further eliminating the discomfort in the depth perception.

In addition, the guide image 130 for writing the cover of a postcard includes, for example, "address", "zip code", and the like in addition to "recipient name". The image data are also stored in the image holding unit 37, and the calculation unit 38 can read and display appropriate image data depending on the position of the hand on the writing surface.

The image display control unit 35 is mounted on a computer comprising well-known hardware components, such as a central processing unit (CPU), a main storage, an auxiliary storage, an input/output interface, and a communication interface. A predetermined program for the above-described image display control is installed in the computer, and by executing this program, it is possible to cause the object position sensor to execute detection of the real object on the writing surface, and perform the calculation processing for obtaining the contour information of the real object from the information from the object position sensor, the image processing for non-displaying a predetermined region of the layout image on the basis of the contour information, and the processing of displaying the image on the image display surface.

In the above embodiment, the image display control unit 35 is provided in the image presentation body 30. The image presentation body 30 is, for example, a tablet computer. However, the image presentation body 30 may be constituted of a flat panel display. In that case, the image presentation body 30 may be connected wirelessly or by wire to a separate computer on which the image display control unit is mounted. In the present embodiment, the camera provided in the tablet computer is used as the object position sensor. However, the object position sensor may be provided separately from the image presentation body 30.

Examples of the first image to be projected onto the writing surface 12 include, for example, the layout or grids of a character surface (back surface) of a letter or a postcard, the navigator of a good hand, a drawing frame, and the layout of an entering document at a public office or a bank in addition to the recipient name surface (front surface) of the above-described postcard.

In addition, the handwriting support device of the embodiment of the invention is applicable to surgery support, surgery education, assembly work support, experimental work support, and the like in addition to the paperwork support.

EXAMPLES

Hereinafter, examples and comparative examples will be described.

In the examples and the comparative examples, in the device illustrated in FIG. 1, the object position sensor was a camera, and the distance from the position sensor to the writing surface was approximately 300 mm. A recipient name writing surface of the postcard was positioned on the writing surface, and a layout image indicating entry positions of an address, a recipient name, and the like was used as the first image. The height of a user's hand (back) that is an object was approximately 50 mm. The position of presence of the hand was determined from RGB information acquired by the camera. Respective examples and comparative examples are different in operation in the image display control unit in the handwriting support device.

Example 1

In accordance with the first display method of the above embodiment, a non-display processed image of a layout image in which only a region corresponding to a vertically projected region of a hand and a writing instrument, which were real objects, was subjected to non-display processing, was displayed on an image display surface. As a result, an image, which was a virtual image of the non-display processed image and was non-displayed inside the vertically projected region of the real object, was projected onto the writing surface (refer to FIG. 6).

Example 2

Figure 8:
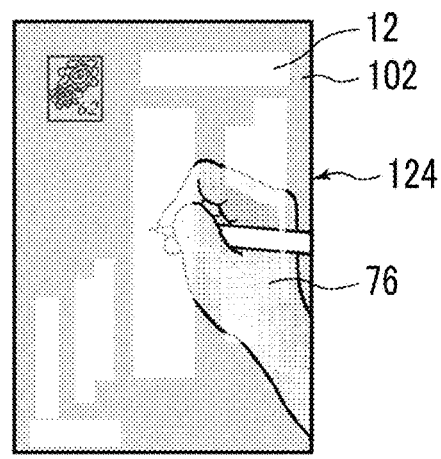
FIG. 8 is a view illustrating a state of the writing surface viewed from the user in the case of the second display method.

In accordance with the second display method of the above embodiment, a non-display processed image of the layout image in which only a region inside the contour of the region corresponding to the vertically projected region of the hand and the writing instrument was subjected to non-display processing was displayed on the image display surface As a result, the virtual image of the non-display processed image, which was non-displayed only on the inside of 10 mm from the contour of the vertically projected region of the hand and the writing instrument, was projected onto the writing surface (refer to FIG. 8).

Example 3

In accordance with the third display method of the above embodiment, a guide image for displaying the contents to be written was overlaid and displayed on the non-display processed image similar to that of Example 1 depending on the position of the hand on the writing surface. As a result, the virtual image of the guide image was projected onto the writing surface. Here, the guide image is projected onto a position that does not overlap the hand even on the layout image.

Example 4

In Example 3, the virtual image of the guide image was projected so as to partially overlap the hand (refer to FIG. 10).

Example 5

In Example 3, the entire virtual image of the second image was projected so as to overlap the hand (refer to FIG. 11).

Comparative Example 1

Figure 12:
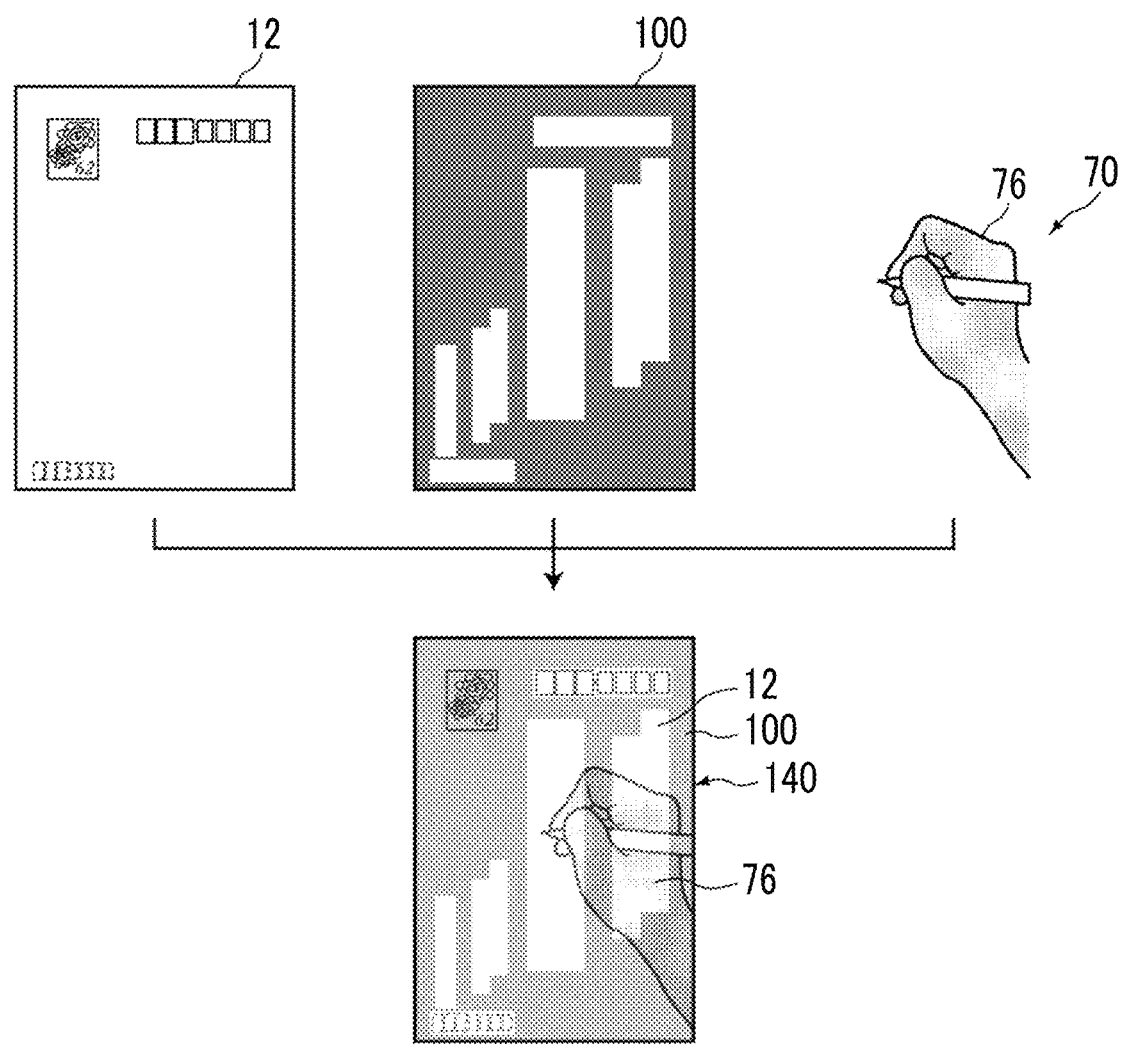
FIG. 12 is a view for illustrating a state of the writing surface viewed from the user in a display method of Comparative Example 1.

By displaying the layout image 100 projected on the writing surface 12 on the image display surface without performing the non-display processing, the layout image was overlappingly projected onto the hand as illustrated in FIG. 12. In this case, in a visual field image 140 by the user, the layout image 100 was seen through the hand that is the real object 70.

Comparative Example 2

Figure 13:
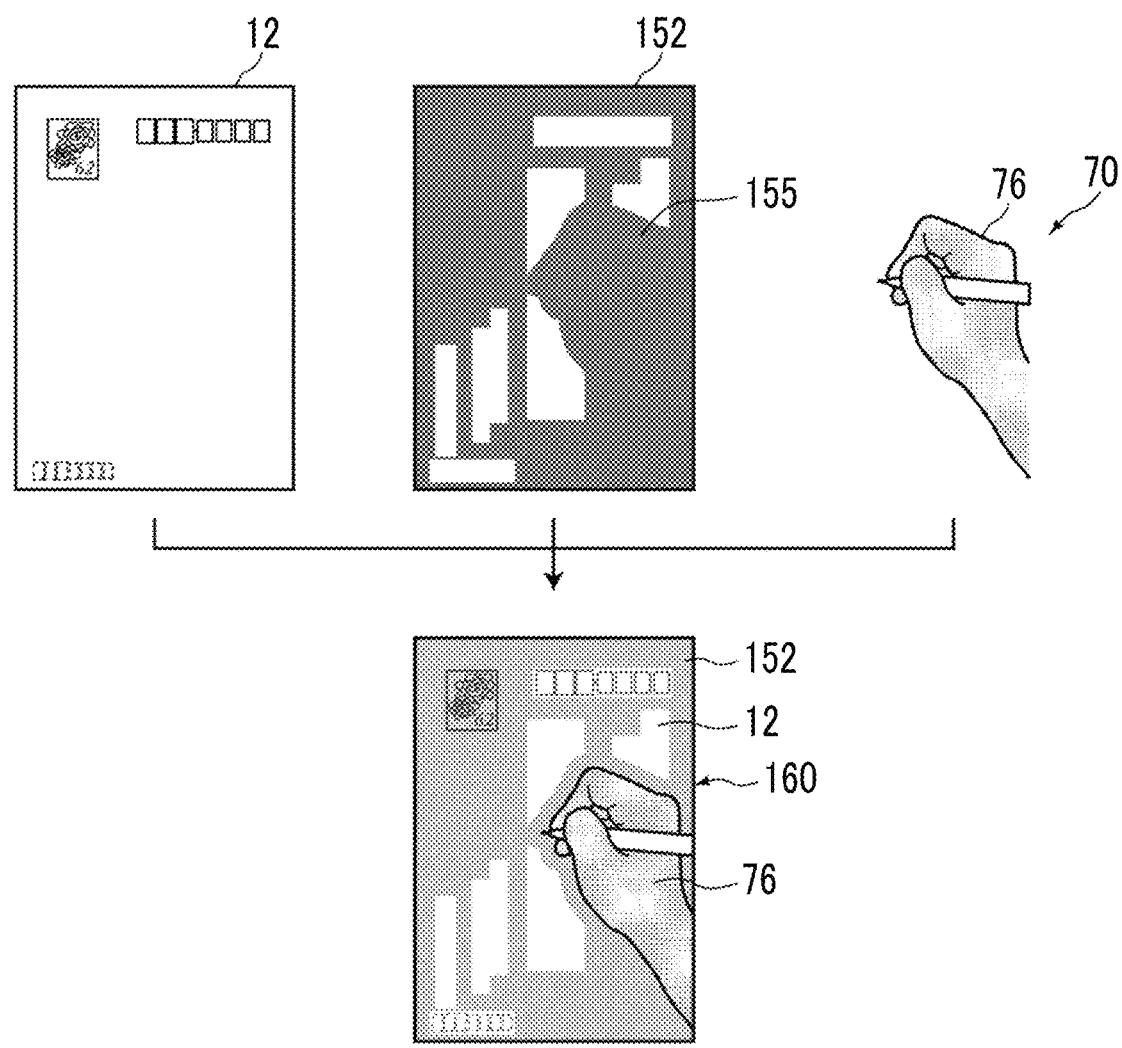
FIG. 13 is a view for illustrating a state of the writing surface viewed from the user in a display method of Comparative Example 2.

A non-display processed image 152 of the layout image in which a region 150 wider than the contour of the region corresponding to the vertically projected region of the hand and the writing instrument was non-display processing was created and displayed on the image display surface. As a result, as illustrated in FIG. 13, an image, which is a virtual image of the non-display processed image 152 and was non-displayed in the region wider than the vertically projected region of the real object, was projected onto the writing surface. In this case, in a visual field image 160 by the user, the non-display processed image 152 was visually recognized behind the user's fingers 76 and the region where the image was not displayed around the fingers 76 by the non-display processing was spread to a range wider than the fingers 76. Thus, the shadow of the fingers 76 was observed to be displayed.

In the display methods of Examples 1 to 5 and Comparative Examples 1 and 2, the usability by the user was compared with each other. Tests were performed in which 20 people were caused to write their recipient names on surfaces of postcards in a state where the display methods of the respective examples were displayed in random order, and the following evaluations were performed.

<Time Taken to Enter Recipient Name>

The time (seconds) from the start of writing to the end thereof was measured.

<Amount of Shift from Center of Recipient Name>

The sum (mm) of the amount shifted laterally from the layout center of the recipient name character gravity center was obtained.

<Naturalness of Experience to Enter Recipient Name>

Test subjects were surveyed in five stages from Unnatural 1 to Natural 5. Sensory evaluation was performed.

Evaluation results for the respective examples are shown in Table 1.

TABLE 1

|  | Comparative Example 1 | Comparative Example 2 | Example 1 | Example 2 | Example 3 | Example 4 | Example 5 |
|---|---|---|---|---|---|---|---|
| Time (s) | 119 | 115 | 117 | 115 | 110 | 108 | 105 |
| Shift Amount (mm) | 2.8 | 3.9 | 3.2 | 2.8 | 3.1 | 3.1 | 3.3 |
| Naturalness | 2 | 5 | 5 | 4 | 5 | 3 | 5 |

As illustrated in FIG. 1, compared to Comparative Example 1, evaluation results that there was less discomfort in the depth were obtained in Examples 1 to 5. In Comparative Example 2, there was no discomfort in the depth, but the amount of shift from the center was larger than in the examples. This is considered to be influenced by the missing of some information in the layout.

What is claimed is:

1. A handwriting support device, comprising:
a half mirror;
an image display surface positioned to face at a side of a mirror surface of the half mirror;
a writing surface positioned to face the image display surface with the mirror surface of the half mirror interposed therebetween; and
an image display control unit that causes a first image to be displayed on the image display surface,
wherein a virtual image of an image displayed on the image display surface is projected onto the writing surface, and
wherein, in a case in which a real object is inserted onto the writing surface, the image display control unit causes a non-display processed image to be displayed on the image display surface, the non-display processed image being obtained by at least a partial region, of a region of the first image corresponding to a vertically projected region of the real object on the writing surface, being subjected to non-display processing, whereby an image, which is a virtual image of the non-display processed image in which at least a part of an inside of the vertically projected region of the real object is non-displayed, is projected onto the writing surface.

2. The handwriting support device according to claim 1, wherein the image display control unit includes an object position sensor that detects the real object on the writing surface, and creates the non-display processed image from image data of the real object acquired by the object position sensor and displays the non-display processed image on the image display surface.

3. The handwriting support device according to claim 1, wherein the image display control unit causes an image to be displayed on the image display surface as the non-display processed image, the image being obtained by only a region, which is inside a position of a predetermined length from the region of the first image corresponding to the vertically projected region of the real object on the writing surface, being subjected to non-display processing.

4. The handwriting support device according to claim 2, wherein the image display control unit causes an image to be displayed on the image display surface as the non-display processed image, the image being obtained by only a region, which is inside a position of a predetermined length from the region of the first image corresponding to the vertically projected region of the real object on the writing surface, being subjected to non-display processing.

5. The handwriting support device according to claim 1, wherein the image display control unit overlays a second image, having a smaller display area than the first image, on the non-display processed image to display the second image on the image display surface.

6. The handwriting support device according to claim 5, wherein the image display control unit causes the second image to be displayed on the image display surface such that at least a part of the second image overlaps with the partial region subjected to the non-display processing of the non-display processed image.

7. The handwriting support device according to claim 6, wherein the image display control unit causes the entire second image to be overlaid and displayed on the partial region.

8. The handwriting support device according to claim 2, wherein the image display control unit overlays a second image, having a smaller display area than the first image, on the non-display processed image to display the second image on the image display surface.

9. The handwriting support device according to claim 8, wherein the image display control unit causes the second image to be displayed on the image display surface such that at least a part of the second image overlaps with the partial region subjected to the non-display processing of the non-display processed image.

10. The handwriting support device according to claim 9, wherein the image display control unit causes the entire second image to be overlaid and displayed on the partial region.

11. The handwriting support device according to claim 3, wherein the image display control unit overlays a second image, having a smaller display area than the first image, on the non-display processed image to display the second image on the image display surface.

12. The handwriting support device according to claim 11, wherein the image display control unit causes the second image to be displayed on the image display surface such that at least a part of the second image overlaps with the partial region subjected to the non-display processing of the non-display processed image.

13. The handwriting support device according to claim 12, wherein the image display control unit causes the entire second image to be overlaid and displayed on the partial region.

* * * * *